United States Patent [19]

Guest et al.

[11] Patent Number: 5,196,461
[45] Date of Patent: Mar. 23, 1993

[54] STYRENIC COPOLYMER/POLYACETAL BLEND COMPOSITIONS

[75] Inventors: Martin J. Guest, Terneuzen; P. F. M. v/d Berghen, Graauw, both of Netherlands; Ludo M. Aerts, Lokeren, Belgium; Antonios Gkogkidis, Terneuzen, Netherlands; Abraham F. de Bert, Zelzate, Belgium

[73] Assignee: The Dow Chemical Company, Midland, Mich.

[21] Appl. No.: 760,553

[22] Filed: Sep. 16, 1991

Related U.S. Application Data

[63] Continuation of Ser. No. 474,415, Feb. 2, 1990, abandoned.

[51] Int. Cl.$^5$ .................. C08L 55/02; C08L 59/02; C08L 59/04
[52] U.S. Cl. ........................ 524/91; 524/291; 524/504; 525/64
[58] Field of Search ............ 525/64; 524/504, 91, 524/291

[56] References Cited

U.S. PATENT DOCUMENTS

| | | | |
|---|---|---|---|
| 4,296,216 | 10/1981 | Sakano | 525/66 |
| 4,701,493 | 10/1987 | Dean | 524/504 |
| 5,047,471 | 9/1991 | Burg | 525/66 |

FOREIGN PATENT DOCUMENTS

| | | |
|---|---|---|
| 0424755 | 5/1991 | European Pat. Off. . |
| 51-39746 | 4/1976 | Japan . |
| 59-176342 | 10/1984 | Japan . |

*Primary Examiner*—Patricia A. Short
*Attorney, Agent, or Firm*—James B. Guffey

[57] ABSTRACT

Thermoplastic polymer blends comprising a major proportion by weight of certain monovinylidene aromatic copolymers and a minor proportion by weight of an acetal polymer have good processability and a beneficial combination of physical and chemical properties including thermal/dimensional stability, chemical resistance and creep resistance. Said polymer blends are suitable for use in the preparation of a variety of molded utilitarian articles having good appearance and paintability.

13 Claims, No Drawings

STYRENIC COPOLYMER/POLYACETAL BLEND COMPOSITIONS

Cross-Reference to Related Application

This is a continuation of application Ser. No. 474,415, filed Feb. 2, 1990, now abandoned.

BACKGROUND OF THE INVENTION

The present invention pertains generally to thermoplastic polymer blends comprising a monovinylidene aromatic copolymer in combination with an acetal polymer and, more particularly, to blends of the indicated type wherein said monovinylidene aromatic copolymer constitutes a major proportion by weight thereof. In one particularly preferred embodiment hereof, the monovinylidene aromatic copolymer is a rubber-modified monovinylidene aromatic copolymer having from about 1 to about 40 weight percent of dispersed rubber particles contained therein.

Blends of various and varying types of polymeric materials have been suggested over the years in a variety of prior art references. Of these, the prior art references utilizing acetal resins as blend components generally illustrate compositions in which the acetal resin forms the major or continuous phase, presumably because of large shrinkage and associated interfacial stress build-up occurring upon cooling from the melt. For example, U.S. Pat. No. 4,665,126 to Kusumgar et al. discloses certain polymeric molding compositions containing a predominant amount (e.g., from about 60 to 95 weight percent) of an acetal polymer ingredient in combination with relatively lesser amounts (e.g., from about 4 to 30 and from about 1 to 10 weight percent, respectively) of a thermoplastic polyurethane (TPU) and a multiphase composite interpolymer such as, for example, a butadiene-based, rubber-modified styrene/methyl- methacrylate polymer. Such Kusumgar et al. formulations are said to have improved impact strength relative to that of the acetal polymer per se and relative to that of comparable two component acetal/TPU or acetal/multiphase composite interpolymer blends and to be useful in various molding applications.

U.S. Pat. No. 4,694,042 to McKee et al. pertains to thermoplastic molding polymer blends containing a minor proportion (i.e., from 5 to 50 parts) by volume of a partially or completely crystalline polymer such as nylon, polyacetal, etc. wherein said crystalline polymer, even through employed in minor volumetric proportion, is nevertheless considered to form a coherent phase and wherein the second, major proportion component forms a dispersed phase therein. Within the indicated McKee et al. blends, said major proportion (i.e., from 50 to 95 parts by volume) component consists of one or more crosslinked, emulsion-polymerized elastomeric polymers such as, for example, butadiene or acrylate rubber-based graft copolymers containing either from 10 to 50 weight percent of a shell having a glass transition temperature of less than −10° C. or a substantially lesser amount of a hard polymer shell of styrene, methylmethacrylate or styrene acrylonitrile copolymer. Acetal resin-based compositions are not evident in the working examples.

British Patent 1,311,305 discloses thermoplastic molding compositions composed of a mixture of from 50 to 99 weight percent of an acetal polymer and from 1 to about 50 weight percent of a butadiene or acrylate rubber-modified, two-phase polymer mixture. Such thermoplastic molding compositions are described as having considerably improved impact strength relative to that of the acetal polymer per se. Preferred embodiments of this reference utilize 80 to 95 weight percent of the acetal polymer component.

U.S. Pat. No. 4,639,488 to Schuette et al. discloses impact resistant polyacetal-based molding materials containing from 30 to 95 weight percent of an acetal polymer and from 5 to 70 weight percent of an emulsion polymerized elastomeric graft copolymer composed, on a graft copolymer weight basis, of from 60 to 90 weight percent of a butadiene-based core (or "grafting base") and from 10 to 40 weight percent of a grafted shell of a styrene and/or methylmethacrylate-based polymer or copolymer. Such molding materials are said to have high impact strength at low temperatures, to exhibit good thermal stability and to resist discoloration in the presence of light.

Another publication concerned with blends of polyacetal resins and polystyrene resins is Japanese Kokai No. 64-38463, published Feb. 8, 1989. Such publication is essentially concerned with polyacetal/polystyrene blends wherein the polyacetal constitutes the major portion by weight thereof and requires in all events that the ratio of the polyacetal melt flow rate (MFR, ASTM D-11238 at 190° C. and 2160 g) to the polystyrene melt flow rate (ASTM D-16238 at 200° C. and 5000 g) be from 5:1 to 100:1. According to such publication, excellent surface appearance is obtained by operating within, and only by operating within, the indicated range of polyacetal: polystyrene melt flow rate ratios.

There remains a continuing need to provide engineering thermoplastic materials having a balance of processability, good aesthetics with no pearlescence and having alternative, advantageous property profiles such as the mechanical strength, creep and chemical resistance and practical toughness as provided by the present invention.

SUMMARY OF THE INVENTION

In accordance with the foregoing, certain polymer blend compositions have now been developed having an advantageous combination of properties of the sort set forth above. Thus, the present invention, in one of its aspects, is a polymer blend composition comprising, on the basis of a total of 100 parts by weight of the stated polymer ingredients:

A. from about 50 to about 90 parts by weight of a monovinylidene aromatic copolymer ingredient selected from the group consisting of
  1. non-rubber-modified monovinylidene aromatic copolymers comprising, in polymerized form and on an aromatic copolymer ingredient weight basis, from about 55 to about 99 weight percent of one or more monovinylidene aromatic monomers and from about 1 to about 45 weight percent of one or more relatively polar comonomer ingredients; and
  2. rubber-modified monovinylidene aromatic copolymers comprising, in polymerized form and on a rubber-modified copolymer weight basis from about 60 to about 99 weight percent of one or more monovinylidene aromatic copolymer as described in item A. 1. above and from about 1 to about 40 weight percent of dispersed particles of a rubbery polymer having a glass transition temperature of 0° C. or lower;

B. from about 1 to about 50 parts by weight of an acetal homopolymer or copolymer ingredient which can be either linear or branched and which can be employed either singly or in combination.

In one of its especially preferred aspects or embodiments, the aforementioned polymer blend composition employs as its monovinylidene aromatic copolymer ingredient a rubber-modified monovinylidene aromatic copolymer comprising, on a rubber-modified copolymer weight basis, from about 2 to about 35 weight percent of dispersed particles of a rubbery polymer selected from the group consisting of homopolymers of a 1,3-conjugated alkadiene monomer and copolymers of from about 60 to about 99 weight percent of a 1,3-conjugated alkadiene monomer with from about 1 to about 40 weight percent of a monoethylenically unsaturated monomer.

In another especially preferred embodiment, the polymer blend compositions hereof further comprise from about 0.01 to about 5 weight percent, on a total composition weight basis, of an antioxidant and/or an ultraviolet light (U.V.) stabilizer ingredient selected from the group consisting of (a) light stabilizers comprising sterically hindered amines and/or ester functional groups such as, for example, bis (2,2,6,6-tetramethyl-4-piperidyl) sebacate (commercially available as TINUVIN ®770 from Ciba Geigy); (b) light stabilizers comprising substituted benzo-triazoles such as, for example TINUVIN ®P and TINUVIN ®234, (also commercially available from Ciba Geigy); and (c) antioxidant additives comprising p-hydroxyphenyl-propionic acid ester, such as, for example, triethyleneglycol-bis-3(3-tert-butyl-4-hydroxy-5-methylphenyl) propionate which is available from Ciba Geigy as IRGANOX ®245. Surprisingly, the presence of the indicated stabilizer/antioxidant ingredients serves to substantially increase the impact strength of the subject polymer compositions.

In yet another especially preferred embodiment hereof, the subject polymer blend compositions further comprise, on a total composition weight basis, from about 5 to about 80 weight percent of a particulate or fibrous inorganic filler or reinforcing ingredient such as, for example, fibers of carbon, graphite, glass and mica. Other mineral fibers such as fibers of titanium oxide or potassium titanate can also be, but are less preferably, employed. The most preferred fiber for use herein is glass fiber. Such filled or reinforced polymer blends (particularly when said blends employ fiberglass as the reinforcing agent at levels of from about 15 to 30 or 40 weight percent thereof) have been observed to exhibit unexpectedly enhanced thermal (e.g., heat distortion) performance.

The indicated polymer blends have a highly advantageous combination of physical, chemical and aesthetic properties including chemical resistance, creep resistance, impact and tensile strength and thermo/dimensional stability. Particularly noteworthy and surprising is the fact that the subject polymer blends have been observed to exhibit higher creep modulus values than that of either of their individual blend components.

DETAILED DESCRIPTION OF THE INVENTION

As has been noted above, the polymer blend compositions hereof are predominantly composed of a monovinylidene aromatic copolymer ingredient which can either be rubber-modified or non-rubber-modified. In either case, suitable monovinylidene aromatic monomer constituents include styrene, alkyl substituted styrenes such as alpha-alkyl-styrene (e.g., alpha-methylstyrene, alpha-ethylstyrene etc.), various ring-substituted styrenes such as para-methylstyrene, ortho-ethylstyrene, 2,4-dimethylstyrene, etc., ring-substituted halostyrenes such as chloro-styrene, 2,4-dichloro-styrene, etc. and the like. Such monovinylidene aromatic monomer (especially styrene) typically constitutes from about 55 to about 99 weight percent of said monovinylidene aromatic copolymer and preferably constitutes from about 60 to about 95 (more preferably from about 65 to about 90) weight percent thereof.

Suitable relatively polar comonomer ingredients for use as the minor constituent in (i.e., constituting from about 1 to about 45 weight percent of) the indicated monovinylidene aromatic copolymers include ethylenically unsaturated nitriles such as acrylonitrile, methacrylonitrile, ethacrylonitrile, etc.; ethylenically unsaturated anhydrides such as maleic anhydride; ethylenically unsaturated amides such as acrylamide, methacrylamide, etc.; esters (especially lower, e.g., $C_1$-$C_6$, alkyl esters) of ethylenically unsaturated carboxylic acids such as methyl methacrylate, ethylacrylate, hydroxyethylacrylate, n-butyl acrylate or methacrylate, 2-ethyl-hexylacrylate, etc.; ethylenically unsaturated dicarboxylic acid imides such as N-alkyl or N-aryl maleimides such as N-phenyl maleimide, etc. Preferably said relatively polar comonomers or mixtures thereof constitute from about 5 to about 40 (more preferably from about 10 to about 35) weight percent of the indicated monovinylidene aromatic copolymer.

Typically, the aforementioned monovinylidene aromatic copolymer is a normally solid, non-elastomeric material having a glass transition temperature above 25° C.

Especially preferred polymer blend compositions hereof are those wherein the monovinylidene aromatic copolymer is rubber modified and comprises on a total rubber modified-copolymer weight basis from about 1 to about 40 (preferably from about 2 to about 35, more preferably from about 3 to about 30 and most preferably from about 5 to about 25) weight percent of dispersed particles of a rubbery polymer having a glass transition temperature of 0° C. or lower. Preferred rubbery polymers for use herein are those having a glass transition temperature of −20° C. or lower. Examples of suitable such rubbery polymers include homopolymers of 1,3-conjugated alkadiene monomers; copolymers of from about 60 to about 99 weight percent of said 1,3-conjugated alkadienes with from about 1 to about 40 weight percent of a monoethylenically unsaturated monomer such as, for example, monovinylidene aromatic monomers (e.g., styrene, etc.) and ethylenically unsaturated nitriles such as acrylonitrile, methacrylonitrile etc.; ethylene/propylene copolymer rubbers and rubbery ethylene/propylene/non-conjugated diene copolymers. Especially preferred rubbery copolymers for use herein include polymers composed of from about 60 to 100 weight percent of 1,3-butadiene and from 0 to about 40 weight percent of styrene or acrylonitrile.

One particular class of rubber-modified monovinylidene aromatic copolymer ingredients of interest of for use herein are graft copolymer compositions wherein the above-discussed rubbery polymer particles serve as substrates having grafted thereto a portion of the above-described monovinylidene aromatic copolymer as a grafted superstrate and wherein the remainder of said monovinylidene aromatic copolymer constitutes a continuous matrix phase in which the indicated grafted rubbery particles are dispersed. In such instances, the matrix phase typically constitutes from about 40 to about 95 (preferably from about 60 to about 95) percent of the overall weight of the indicated rubber-modified compositions and the grafted copolymer constituents constitutes the remainder thereof. Typically the grafted copolymer constituent will have a grafted superstrate to graftable rubber substrate ratio (i.e., a graft to rubber or "G/R" ratio) of from about 0.1:1 to about 1:1 (preferably from about 0.35:1 to about 0.45:1). Typically, the indicated rubber-modified monovinylidene aromatic copolymer ingredients employed herein will have a melt flow rate within the range of from about 0.5 to about 12 (preferably from about 1 to about 10) grams per 10 minutes as determined pursuant to ASTM D-1238 at 230° C. and 3.8 kg.

The aforementioned rubber-modified monovinylidene aromatic graft copolymer hereof can suitably be prepared in any known manner by free radical polymerization of the selected comonomer materials in the presence of the modifying rubber material. Suitable techniques thus include conventional mass, solution, suspension or emulsion polymerization processes. If emulsion polymerized graft copolymers are to be employed, care should be taken to remove or neutralize residual acid moieties. Otherwise decomposition of the acetal polymer component can result. Especially preferred for use herein are rubber-modified monovinylidene aromatic graft copolymers prepared via mass or mass/suspension polymerization techniques.

In general, mass polymerization involves polymerizing a solution of the rubber and monomer(s) at conditions sufficient to form discrete rubber particles of the desired particle size dispersed throughout the polymerized monomer. The polymerization is advantageously conducted in one or more substantially linear stratified flow or so-called plug-flow reactors such as described in U.S. Pat. No. 2,727,884 which may or may not comprise recirculation of a portion of the partially polymerized product or in a stirred tank reactor wherein the contents of the reactor are essentially uniform throughout.

The polymerization is advantageously conducted in an organic liquid reaction diluent such as aromatic or inertly substituted aromatic hydrocarbons (e.g., benzene or toluene) and in the presence of a freeradical initiator such as the peroxide initiators, (e.g., dibenzoyl peroxide or 1,1-bis-tertiary butylperoxycyclohexane). In general, the initiator will be employed in an amount from 100 to 5000 weight parts per million weight parts of the monomers employed. The organic liquid reaction diluent is generally employed to control the viscosity of the polymerization mixture and is generally employed in an amount from 2 to 20 weight percent based on the total weight of the rubber, monomer and diluent. The polymerization mixture can further contain other adducts such as a plasticizer or lubricant (e.g., mineral oil); and antioxidant (e.g., an alkylated phenol such as di-tert-butyl-p-cresol); a polymerization aid (e.g., a chain transfer agent such as an alkyl mercaptan) or a mold release agent, (e.g., zinc stearate). Temperatures at which polymerization is normally conducted are dependent on the specific components employed but will generally vary from 60° to 190° C.

In the preparation of the rubber-reinforced polymer resin, the mass polymerization can be continued to the desired completion and then treated to remove any unreacted monomer such as by flashing off the monomer and other volatiles at an elevated temperature under vacuum.

Mass/suspension polymerization involves initially mass polymerizing the monomer/rubber mixture and, following phase inversion (i.e., the conversion of the polymer from a discontinuous phase dispersed in a continuous phase of the rubber solution through the point where there is no distinct continuous or discontinuous phase in the polymerization mixture to continuous polymer phase having the rubber dispersed therethrough) and subsequent size stabilization of the rubber particles, suspending the partially polymerized product, with or without additional monomer(s), in an aqueous medium which generally contains a polymerization initiator. Subsequently, polymerization is completed using suspension polymerization techniques.

As has been noted, the indicated monovinylidene aromatic copolymer ingredient constitutes the major proportion (i.e., from about 50 to about 99 weight percent) of the polymer blend compositions hereof. Preferably, said monovinylidene aromatic copolymer is employed in amounts corresponding to from about 50 to about 95 (more preferably from about 55 to about 95, especially from about 60 to about 90 and most preferably from about 65 to about 85) parts by weight per 100 parts of the combined or total weight of the selected monovinylidene aromatic copolymer and acetal homopolymer or copolymer ingredient.

The acetal (sometimes termed polyoxymethylene) resin can be any of those commonly known in the art or commerically available. Thus, the acetal can either be a linear or branched, copolymer or homopolymer resin or mixtures of these. Copolymers can contain one or more comonomers such as those generally used in preparing acetal resins. Comonomers more commonly used include alkylene oxides of 2 to 12 carbon atoms, typically in an amount constituting less than 20 weight percent of said acetal resin ingredient. Polyoxymethylenes which contain from 0.5 to 10 weight percent, in particular from 1 to 5 weight percent of ethylene oxide are particularly important commercially and are especially preferred for use herein. As a general rule, the available acetal resins have thermally stable terminal groups, such as ester or ether groups, for example acetate or methoxy groups. The polyoxymethlenes have, in general, a molecular weight of from about 10,000 to about 100,000. As an alternative to molecular weight, melt flow rate (MFR) is commonly used to characterize resins, and those with higher molecular weights have lower melt flow rates. Preferred acetal resins for use in the compositions of the present invention are those which have MFRs of 0.1 to 60 grams/10 minutes, more preferably 0.5 to 30 grams/10 minutes and especially from 0.5 to 5 or 10 grams/10 minutes as determined at 190° C. and 2.16 kg. If the MFR is too high, the melt viscosity of the acetal will be too low and it will be difficult to achieve sufficient intimate mixing of components at appropriate shear rates. If the MFR is too low, the temperature for the compounding operation may become too high and degradation can result. As will be evident in the examples, and assuming all other parameters are equal, the lower the MFR, the higher the toughness of the compositions of the present invention.

As noted above, the acetal polymer ingredient of the subject polymer blend compositions constitutes a minor proportion by weight (i.e., from about 1 to about 50 weight percent) of said polymer blend compositions. Preferably, said acetal polymer is utilized in an amount corresponding to from about 5 to about 50 (more preferably from about 5 to about 45, especially from about 10 to about 40 and most preferably from about 15 to about 35) parts by weight per 100 parts weight of the total or combined weight of the selected acetal polymer and monovinylidene aromatic copolymer ingredients.

The polymer blend compositions hereof are conveniently prepared by dry blending the individual polymer ingredients to be employed in particulate (e.g., pelletized) form and in the quantitative proportions desired in a given instance and thereafter melt compounding the particulate polymer mixture in accordance with known extrusion compounding techniques. In connection with the indicated melt compounding operation, it is generally preferred to conduct such operation at a temperature of not exceeding 240° C., especially at a melt temperature in the range of from about 180° to about 230° C.

Various optional additives may also be included in the polymer blend compositions hereof for different purposes as are well known in the art, including bisphenol-type, ester-type or hindered phenol-type additives and anti-oxidants as disclosed, for example, in U.S. Pat. Nos. 3,103,499 and 3,240,753, amine and amidine as disclosed, for example, in U.S. Pat. Nos. 3,313,767 and 3,314,918, nucleants, UV screens and absorbers, metal soaps, glass beads, talc, polymeric substances other than those critical to this invention such as additives commonly known as mold release agents, plasticizers, antistatic agents, etc. which are compatible with the blends and color pigments which are compatible with acetal polymers. However, the use of the mentioned additives is not considered to be necessary for the operability of present invention.

The polymer blend compositions hereof can also optionally include, and oftentimes do preferably include, additional thermoplastic polymer ingredients in combination with the above-described monovinylidene aromatic copolymer and acetal resin constituents. Thus, for example, it has been observed that the inclusion of a minor proportion (e.g., from about 1 to about 50 parts by weight per 100 parts by weight of the overall blend composition) of an elastomeric thermoplastic polyurethane (especially a polyester-based thermoplastic polyurethane elastomer) and/or a copolyester elastomer material can be especially beneficial in terms of substantially enhancing the impact resistance of the resulting polymer blend composition. Similarly, it has also been observed that certain advantageous property benefits can be obtained by additionally including a polycarbonate or polyester resin constituent within the subject monovinylidene aromatic copolymer/acetal resin blend compositions either with or without (but preferably with) the further inclusion of the aforementioned elastomeric thermoplastic polyurethane and/or copolyester elastomer ingredients.

With regard to the aforementioned optional additive materials, it is important to note that a surprising phenomenon has been discovered in the context of the subject polymer blends in that the addition of a minor amount (e.g., from about 0.01 to about 5, preferably from about 0.05 to about 1.5 and especially from about 0.1 to about 1.0 weight percent) of certain selected antioxidant and/or U.V. stabilizer ingredients has been found to unexpectedly also provide dramatically increased impact strength within the polymer blend compositions of concern. In particular, U.V. light stabilizers comprising sterically hindered amines and/or ester functional groups as well as substituted benzotriazoles (for example TINUVIN ®770 and 234) and antioxidants comprising p-hydroxyphenyl propionic acid esters (for example IRGANOX ®245) have been found to be effective in this regard. Especially preferred in this connection are compositions which employ from about 0.1 to about 0.5 weight percent of TINUVIN ®234 and/or from about 0.1 to about 1.0 weight percent of TINUVIN ®770 and particularly when one or both of the former are used in combination with from about 0.1 to about 0.5 weight percent of IRGANOX ®245.

The polymer blend compositions hereof preferably also contain a minor proportion (e.g., from about 0.01 to about 15 parts by weight per 100 parts by weight of the overall blend composition) of one or more oxirane or substituted oxirane-containing ingredients. In this regard, it can be noted that the inclusion of oxirane or substituted oxirane-containing ingredients has been found to substantially improve the color stability of the subject polymer blends during the melt processing (e.g., melt blending and/or injection molding) thereof and to thereby widen the processability window of such blends by allowing increased processing temperatures to be employed without encountering discoloration problems.

Oxirane or substituted oxirane-containing ingredients for use herein are preferably selected from epoxyhydrocarbons, such as, for example mono- or diglycidyl ethers of aromatic or aliphatic alcohols, with bisphenol-A or substituted bisphenol-A, orthocresol and 1,6-hexanediol being preferred alcohols. Other preferred substituted oxirate-containing ingredients include epoxidised vegetable oils, preferably epoxidised soybean and epoxidised linseed oil. Other suitable, but somewhat less preferred oxirane-containing ingredients are based upon epoxidised alkyl fatty esters, epoxy acids, epoxy salts as well as other epoxy-group functionalised ingredients.

Another surprising phenomenon which has been observed in connection with the polymer blends hereof relates to the glass fiber reinforcement thereof. Specifically, it has been found that compounded fiberglass reinforced polymer blend compositions hereof (e.g., containing from about 5 to about 80 weight percent glass fiber on a total composition weight basis can have unexpectedly enhanced thermal stability characteristics (e.g., heat distortion temperatures) and also that said phenomenon is particularly pronounced and beneficial at fiberglass contents of from about 15 to about 60 (especially from about 20 to about 50) weight percent on a total composition weight basis and at acetal polymer to monovinylidene aromatic copolymer weight ratios of from about 25:75 to about 50:50.

The polymer blend compositions of the present invention have good processability characteristics and are suitable for use in a wide variety of injection molding applications. Such compositions are particularly useful in such applications wherein good thermal/dimensional stability, creep resistance and chemical resistance properties are required and have also been found to be paintable. Suitable exemplary end-use applications thus include automotive interior and exterior parts, tool casings, appliance housings and the like.

The present invention is further understood and illustrated by reference to the following examples thereof.

EXAMPLES 1 AND 2

In these examples two polymer blend compositions are prepared, one (i.e., Example 1) containing 70 weight percent of an acrylonitrile/butadiene/styrene (ABS) resin and 30 weight percent of an acetal resin and the other (i.e., Example 2) containing 75 weight percent of said ABS resin and 25 weight percent of the acetal resin.

In preparing said polymer blend compositions, the indicated proportions of the individual resin ingredients in pelletized form are dry blended and are then melt compounded in an extruder at a temperature of from 210° to 220° C. and pelletized. Subsequently, the pelletized polymer blend compositions are injected molded into test pieces (10×10×0.3 cm plaques) and are subjected to dimensional stability testing at 125° C.

For comparative purposes, plaques are also made from the individual ABS and acetal resin components and are subjected to dimensional stability testing.

The results of said dimensional stability testing are presented in Table I.

TABLE I

| | Change in Dimensions (%) | | | |
|---|---|---|---|---|
| | 1.5 hours at 125° C. | | 5.5 hours at 125° C. | |
| Resin Sample | Parallel | Perpendicular | Parallel | Perpendicular |
| Example 1 (70:30 ABS: Acetal) | 1.18 | 1.03 | 1.33 | 1.13 |
| Example 2 (75:25 ABS: Acetal) | 1.64 | 1.33 | 1.75 | 1.42 |
| Acetal[1] | less than 0.5 | less than 0.5 | — | — |
| ABS[2] | greater than 11 | greater than 2 | — | — |

[1]Acetal = ULTRAFORM ™ N2320 from BASF (MFR at 190° C. and 2.16 Kg = 9.0)
[2]ABS = Mass polymerized ABS resin containing 12 weight percent polybutadiene rubber, 14 weight percent acrylonitrile and 74 weight percent styrene and having a melt flow rate of 3.3 (as determined pursuant to ASTM D-1238 at 230° C. and 3.8 kg) and an average rubber particle size of 1.2 micron.

EXAMPLE 3

In this example a 50:50 weight ratio ABS:Acetal polymer blend is prepared and is tested for its heat sag characteristics in accordance with ASTM D3769. The results are presented in Table II along with the corresponding results for the individual ABS and acetal resin ingredients. The ABS and Acetal resin materials employed are the same as those employed in Example 1 and 2.

TABLE II

| Sample | Sag[1] (mm) |
|---|---|
| Example 3 (50:50 ABS:Acetal) | 3.75 |
| Acetal | 1.25 |
| ABS | greater than 15 |

[1]Sample = 3 mm thickness and 12.5 mm wide. Test conditions: Test Bars supported horizontally, 100 mm unsupported overhang. One hour at 130°.

EXAMPLE 4

In this example, a 50:50 ABS/Acetal blend composition is prepared and tested for chemical resistance relative to the individual blend components. The Acetal and ABS resins employed are the same as those in Examples 1 and 2. The results are presented in Table III.

TABLE III

| | Chemical Resistance[1] | | | |
|---|---|---|---|---|
| | Tensile | | Elongation | |
| Sample | Yield | Rupture | Yield | Rupture |
| Example 4 (50:50 ABS: Acetal) | −4 | −3 | 0 | −1 |
| ABS | S.D.* | S.D. | S.D. | S.D. |
| Acetal | −3 | −3 | +9 | +1 |

*S.D. = Severe Degradation. Could not be tested.
[1]Change in Tensile and Elongation Properties one hour after immersion for 5 minutes in a solution of 42.5 percent isooctane, 42.5 percent toluene and 15 percent methanol.

As can be seen, the 50:50 ABS/Acetal blend has chemical resistance at least comparable to the pure acetal material whereas the pure ABS ingredient is severely degraded by the indicated solvent solution.

EXAMPLE 5

In this example, 50:50 and 75:25 weight ratio ABS/Acetal blend compositions are tested for creep resistance relative to that of the individual blend components for times exceeding 1000 hours. Quite surprisingly, both blend compositions are found to have better creep resistance than the individual components thereof, as seen from the results presented in Table IV.

TABLE IV

| Resin | Temp. °C. | Initial Stress MPa | Creep (Apparent) Modulus* (MPa) As A Function Of Time | | | |
|---|---|---|---|---|---|---|
| | | | 1 | 10 | 100 | 1000 |
| ABS | 50 | 8.5 | 1100 | 955 | 680 | 425 |
| Acetal | 50 | 9.4 | 920 | 805 | 680 | 620 |
| ABS/Acetal 50:50 | 50 | 8.6 | 1235 | 1100 | 885 | 725 |
| — | — | — | — | — | — | — |
| ABS | 29 | 14.6 | 1500 | 1370 | 1140 | 790 |
| Acetal | 29 | 16.4 | 1500 | 1285 | 1050 | 920 |
| ABS/Acetal 75:25 | 29 | 15.2 | 1700 | 1470 | 1245 | 1010 |

*Injection molded tensile test bars (ISO R 527-1966, Specimen 1) Samples conditioned 40 hours at test temperature prior to load application.

EXAMPLES 6–13

In these examples, a series of ABS/Acetal blends are prepared and subjected to physical property testing. The results are summarized in Table V along with the results for the individual ABS and Acetal ingredients of said blends.

TABLE V

| | Pure Acetal | Pure ABS | Example 6 | Example 7 | Example 8 | Example 9 | Example 10 | Example 11 | Example 12 | Example 13 |
|---|---|---|---|---|---|---|---|---|---|---|
| Acetal (Parts by Weight) | 100[1] | | 50[1] | 25[1] | 30[2] | 20[2] | 30[3] | 20[3] | 15[2] | 50[5] |
| ABS[4] (Parts by Weight) | | 100 | 50 | 75 | 70 | 80 | 70 | 80 | 85 | 50 |
| Izod Impact (J/M) ISO 180-1 82 | 80 | 200 | 28 | 55 | 72 | 83 | 32 | 53 | 100 | 55 |

TABLE V-continued

| | Pure Acetal | Pure ABS | Example 6 | Example 7 | Example 8 | Example 9 | Example 10 | Example 11 | Example 12 | Example 13 |
|---|---|---|---|---|---|---|---|---|---|---|
| Acetal (Parts by Weight) | 100[1] | | 50[1] | 25[1] | 30[2] | 20[2] | 30[3] | 20[3] | 15[2] | 50[5] |
| ABS[4] (Parts by Weight) | | 100 | 50 | 75 | 70 | 80 | 70 | 80 | 85 | 50 |
| Tensile Yield/Rupture (MPa)[6] | 64/58 | 44/37 | 46/42 | 44/37 | 41/34 | 41/34 | 41/37 | 39/33 | 41/35 | 46/43 |
| Elongation Yield/Rupture (%)[6] | 8/37 | 3/30 | 3/8 | 3/14 | 3/57 | 3/35 | 3/6 | 3/15 | 3/10 | 3.5/30 |
| Emod (MPa)[6] | 3100 | 2000 | 2230 | 2100 | 2040 | 2020 | 2070 | 2000 | 2000 | 2170 |
| Vicat sp (°C.) ISO 306-1974 Method A, 120° C./hr. | 163 | 107 | 144 | 111 | 113 | 108 | 113 | 108 | 108 | 152 |

[1]BASF Ultraform ™ N2320 Acetal Copolymer    MFR* = 9.0 (190° C., 2.16 kg)
[2]Celanese  Celcon ™ M25  Acetal Copolymer    MFR* = 2.5
[3]Celanese  Celcon ™ M270 Acetal Copolymer    MFR = 27.0
[4]ABS = 72% Styrene, 16% Acrylonitrile and 12% Polybutadiene. Particle size = 1.2 μm. Produced by way of a mass polymerization process.
[5]DuPont Delrin ™ 100 MFR = 2.0
[6]ISO R 527-1966 Specimen 1; 100 mm/min. test speed
*MFR = Melt Flow Rate As can be seen from the results from in Table IV, the polymer blend compositions containing relatively low melt flow rate (MFR)/high molecular weight acetal polymer ingredient are preferable in the sense that they exhibit notably higher ultimate failure properties such as impact or tensile elongation at rupture than do the similar or corresponding compositions employing the relatively higher melt flow rate acetal ingredients.

EXAMPLE 14

In this example polymer blend compositions are prepared containing varying amounts of at glass fiber (Owens Corning 429 YZ) as a reinforcing agent and are tested to determine the Vicat heat distortion characteristics of the resulting compositions. While the presence of the glass fiber ingredient increased the Vicat temperature in all cases, the magnitude of said increase is disproportionately greater in the blended ABS/Acetal formulations than in the individual ABS and Acetal resins alone and this is observed to be particularly noticeable at fiberglass content levels of 20 and 30 weight precent on a total weight basis and at ABS to Acetal weight ratios of from about 90:10 to about 50:50 (especially from about 75:25 to about 50:50).

While the present invention has been described and illustrated with reference to particular embodiments and examples thereof, such is not be interpreted as in any way limiting the scope of the instantly claimed invention.

What is claimed is:

1. A polymer blend composition comprising, on the basis of a total of 100 parts by weight of the stated polymer ingredients:
   A. from about 50 to 85 parts by weight of a rubber-modified monovinylidene aromatic copolymer ingredient which comprises, on a rubber-modified copolymer weight basis, (1) from about 2 to about 35 weight percent of dispersed particles of a rubbery conjugated diene polymer (a) which has a glass transition temperature of 0° C. or lower and is selected from the group consisting of homopolymers of a 1,3-conjugated alkadiene monomer and copolymers of from about 60 to about 99 weight percent of a 1,3-conjugated alkadiene monomer with from about 1 to about 40 weight percent of a monoethylenically unsaturated monomer; and (b) which serves as a substrate having grafted thereto a superstrate polymer composed of a monovinylidene aromatic copolymer comprising, in polymerized form and on a grafted superstrate polymer weight basis, from about 55 to about 99 weight percent of one or more monovinylidene aromatic monomers and from about 1 to about 45 weight percent of one or more ethylenically unsaturated nitrile comonomers and (2) wherein the remainder of said rubber-modified monovinylidene aromatic copolymer is composed of a continuous monovinylidene aromatic copolymer matrix phase comprising, in polymerized form and on a matrix phase weight basis from about 55 to about 99 weight percent of one or more monovinylidene aromatic monomers and from about 1 to about 45 weight percent of one or more ethylencially unsaturated nitrile comonomers; and
   B. from 15 to about 50 parts by weight of one or more acetal homopolymer or copolymer ingredients having a melt flow rate, measured at 190° C. and 2.16 kg, of from 0.5 to 5 grams per 10 minutes.

2. The polymer blend composition of claim 1 wherein the grafted superstrate to rubber substrate weight ratio within the rubber-modified monovinylidene aromatic copolymer is from about 0.1:1 to about 1:1.

3. The polymer blend composition of claim 1 wherein said composition comprises, per 100 parts by weight of the stated polymer ingredients,
   A. from about 65 to 85 parts by weight of said rubber modified monovinylidene aromatic copolymer and
   B. from 15 to about 35 parts by weight of said acetal homopolymer or copolymer.

4. The polymer blend composition of claim 1 wherein the rubber-modified monovinylidene aromatic copolymer comprises from about 3 to about 30 weight percent of the dispersed rubbery polymer particles.

5. The polymer blend composition of claim 1 wherein the rubber modified monovinylidene aromatic copolymer comprises from about 5 to about 25 weight percent of the dispersed rubbery polymer particles.

6. The polymer blend composition of claim 1 wherein said composition further comprises, on a total composition weight basis, from about 5 to about 80 weight percent of a particulate of fibrous inorganic filler or reinforcing ingredient.

7. The polymer blend composition of claim 6 wherein the inorganic filler or reinforcing ingredient constitutes from about 20 to about 50 weight percent of said composition on a total composition weight basis.

8. The polymer blend composition of claim 7 wherein the inorganic filler or reinforcing ingredient is glass fibers.

9. The polymer blend composition of claim 1 wherein said composition further comprises, on a total compositions weight basis, from 0.01 to about 5 weight percent of one or more U.V. stabilizer ingredients.

10. The polymer blend composition of claim 9 wherein said composition further comprises, on a total composition weight basis, from 0.01 to about 5 weight of an antioxidant ingredient.

11. The polymer blend composition of claim 10 wherein said composition comprises, on a total composition weight basis, from 0.1 to about 1.0 weight percent of one or more sterically hindered amine and/or ester functional group-containing U.V. stabilizers or one or more substituted benzo-triazole U.V. stabilizers and from about 0.1 to about 1.0 weight percent of one or more para-hydroxyphenyl propionic acid ester antioxidant ingredients.

12. The polymer blend composition of claim 1 wherein the monovinylidene aromatic copolymer further comprises one or more additional relatively polar monomer ingredients selected from the group consisting of ethylenically unsaturated anhydrides, ethylenically unsaturated amides, esters of ethylenically unsaturated carboxylic acids and ethylenically unsaturated dicarboxylic acid imides.

13. The polymer blend composition of claim 1 wherein the monovinylidene aromatic copolymer matrix phase constitutes from about 40 to about 95 weight percent of the rubber-modified monovinylidene aromatic copolymer ingredient.

* * * * *